(12) United States Patent
Leon-Guerrero

(10) Patent No.: US 12,332,019 B2
(45) Date of Patent: Jun. 17, 2025

(54) ADJUSTABLE TARGET SIGHT

(71) Applicant: Sig Sauer, Inc., Newington, NH (US)

(72) Inventor: Edward P. Leon-Guerrero, Wilsonville, OR (US)

(73) Assignee: SIG SAUER, INC., Newington, NH (US)

( * ) Notice: Subject to any disclaimer, the term of this patent is extended or adjusted under 35 U.S.C. 154(b) by 0 days.

(21) Appl. No.: 18/111,343

(22) Filed: Feb. 17, 2023

(65) Prior Publication Data

US 2023/0266100 A1 Aug. 24, 2023

Related U.S. Application Data

(60) Provisional application No. 63/312,502, filed on Feb. 22, 2022, provisional application No. 63/311,799, filed on Feb. 18, 2022.

(51) Int. Cl.
| | |
|---|---|
| *F41G 1/34* | (2006.01) |
| *F41G 11/00* | (2006.01) |
| *G02B 23/16* | (2006.01) |
| *F41G 1/38* | (2006.01) |

(52) U.S. Cl.
CPC ............ *F41G 1/345* (2013.01); *F41G 11/003* (2013.01); *G02B 23/16* (2013.01); *F41G 1/38* (2013.01)

(58) Field of Classification Search
CPC ... F41G 1/033; F41G 1/16; F41G 1/26; F41G 1/28; F41G 1/30; F41G 1/32; F41G 1/34; F41G 1/345; F41G 1/35; F41G 1/36; F41G 1/38; F41G 11/003; F41G 11/005; F41G 11/006; F41G 11/007; G02B 23/16
USPC .......................................................... 42/132
See application file for complete search history.

(56) References Cited

U.S. PATENT DOCUMENTS

| | | | |
|---|---|---|---|
| 4,665,622 A * | 5/1987 | Idan ...................... | G02B 23/105 356/252 |
| 4,764,011 A * | 8/1988 | Goldstein .............. | G02B 23/12 42/113 |
| 7,797,843 B1 | 9/2010 | Scott et al. | |
| 9,423,212 B2 * | 8/2016 | Campean ................ | F41G 1/345 |
| 2010/0083554 A1 * | 4/2010 | Elpedes ................... | F41G 1/30 42/130 |
| 2014/0237884 A1 * | 8/2014 | Koesler ................... | F41G 1/345 42/111 |
| 2016/0305741 A1 * | 10/2016 | Jeung ...................... | F41G 1/345 |
| 2019/0353454 A1 * | 11/2019 | Courtice .................. | F41G 1/01 |

* cited by examiner

*Primary Examiner* — Joshua E Freeman
*Assistant Examiner* — Benjamin S Gomberg
(74) *Attorney, Agent, or Firm* — Miller Nash LLP

(57) ABSTRACT

A target sight for a firearm includes a base for securing a body of the target sight to the firearm, a light source coupled to a carrier mount that is disposed within a carrier plate, a horizontal adjustment system for the carrier plate structured to cause the carrier plate to move horizontally within the body of the target sight, and a vertical adjustment system for the carrier mount structured to cause the carrier mount to move vertically relative to the carrier plate. Methods are also described.

18 Claims, 21 Drawing Sheets

ADJUSTABLE TARGET SIGHT

CROSS REFERENCE TO RELATED APPLICATIONS

This application is a non-provisional of and claims benefit to U.S. Provisional application 63/311,799, filed Feb. 18, 2022, entitled ADJUSTABLE TARGET SIGHT, and U.S. Provisional application 63/312,502, filed Feb. 22, 2022, entitled ADJUSTABLE TARGET SIGHT, both of which are incorporated herein by reference in their entirety.

FIELD OF THE INVENTION

This disclosure is directed to targeting sights or scopes, and, more particularly, to a targeting sight having a new form of target light adjustment.

BACKGROUND

Optical sights, such as reflex or red-dot sights, provide a shooter a quick and easy way to sight a target compared to conventional iron sights. Reflex sights are optical sights that include a partially reflecting element on which an aiming light or target is projected. An LED or other light emitter is commonly used as the light source. When the emitter generates its light signal, the projected light reflects from the reflecting element, such as a lens or other optic, and the reflection is seen by the shooter as being superimposed on the target or field of view. This reflection is referred to as a Point of Aim (PoA). In operation, the shooter then aligns the target to the PoA to accurately aim the firearm at the target. Other sights generate a beam of light to be projected onto a target itself.

Modern reflex sights typically include a positioning apparatus to change the relative location of the emitted light on the reflective lens. Changing the relative location of the emitted light allows the shooter to compensate for targets at various distances or for a misalignment between the sight and the barrel. Without compensation, the shooter may have to aim the firearm at a non-indexed location that is different than the actual PoA to account for these effects.

A typical positioning apparatus on a reflex sight includes an LED (Light Emitting Diode) or other light source mounted at one end of an elongated tube, which is mounted in the body of the sight. The shooter may adjust the longitudinal and/or latitudinal position of the tube relative to the body of the sight, typically by turning threaded adjusters that are mechanically coupled between the body of the sight and the elongated tube. Moving the position of the tube, in turn, moves the reflected position of the light emitted from the emitter, off the optic lens, and back to the shooter, allowing the reflex sight to cause the targeting dot to be positioned in the new position. Positioning apparatuses on modern reflex sights are complex, require tight manufacturing tolerances, and are subject to wear and breakage. Further, it is possible that extreme shocks, such as shocks from dropping the firearm, can cause the tube to move or even dislodge. In addition, tubes can have undesirable phenomena while adjusting, such as non-linear travel, dead clicks, and inconsistency in resolution per revolution.

Embodiments of the invention address these and other limitations of present sights.

DESCRIPTION

Embodiments of the invention are directed to adjustment systems in an illuminated aiming device. The illumination can be in a form of a LED, holographic, display, or any type of illumination.

Figure 1:
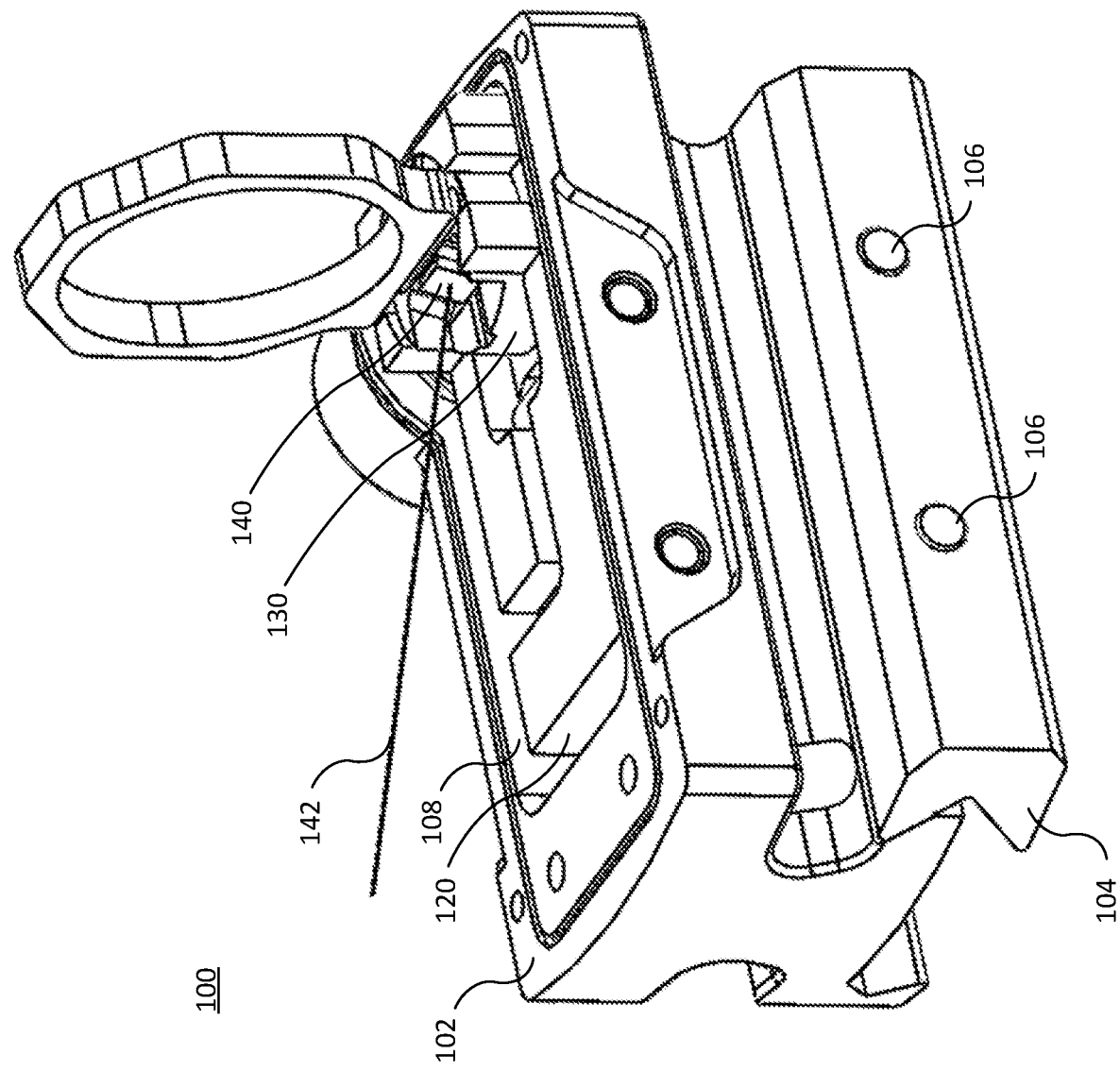
FIG. 1 is a perspective view of components of an adjustable target sight according to embodiments of the invention.

FIG. 1 is a perspective view of components of an adjustable target sight 100 according to embodiments of the invention. The sight 100 includes a base 102, which securely mounts to a firearm (not illustrated). In some embodiments the base 102 mounts to a rail of the firearm through a rail clamp 104, which is secured to the rail using rail bolts 106. Other embodiments mount to the rail or the firearm using other methods. FIG. 1 also includes a beam 142, illustrating the illuminated aiming device to be adjusted as described herein.

The target sight 100 includes a carrier plate 120, which, in the illustrated embodiment, sits in a pocket 108 of the base 102 and adjusts laterally with respect to the base. The carrier plate 120 supports a carrier mount 130, which, as described below, adjusts vertically with respect to the carrier plate 120, and, by extension, adjusts vertically with respect to the base 102. The carrier mount 130 carries an illumination device 140 that produces a beam or image 142. By adjusting the carrier plate 120 horizontally relative to the base 102 and adjusting the carrier mount 130 vertically relative to the carrier plate, the beam 142 may be adjusted both horizontally and vertically relative to the base 102, which changes the PoA for the shooter. Horizontal adjustment of the carrier plate 120 relative to the base 102 is described with reference to FIGS. 1-4, and a first form of vertical adjustment of the carrier mount 130 is described with reference to FIGS. 5-8. Then, other forms of vertical adjustment of the carrier mount 130 are described with reference to FIGS. 9-20.

Figure 2:
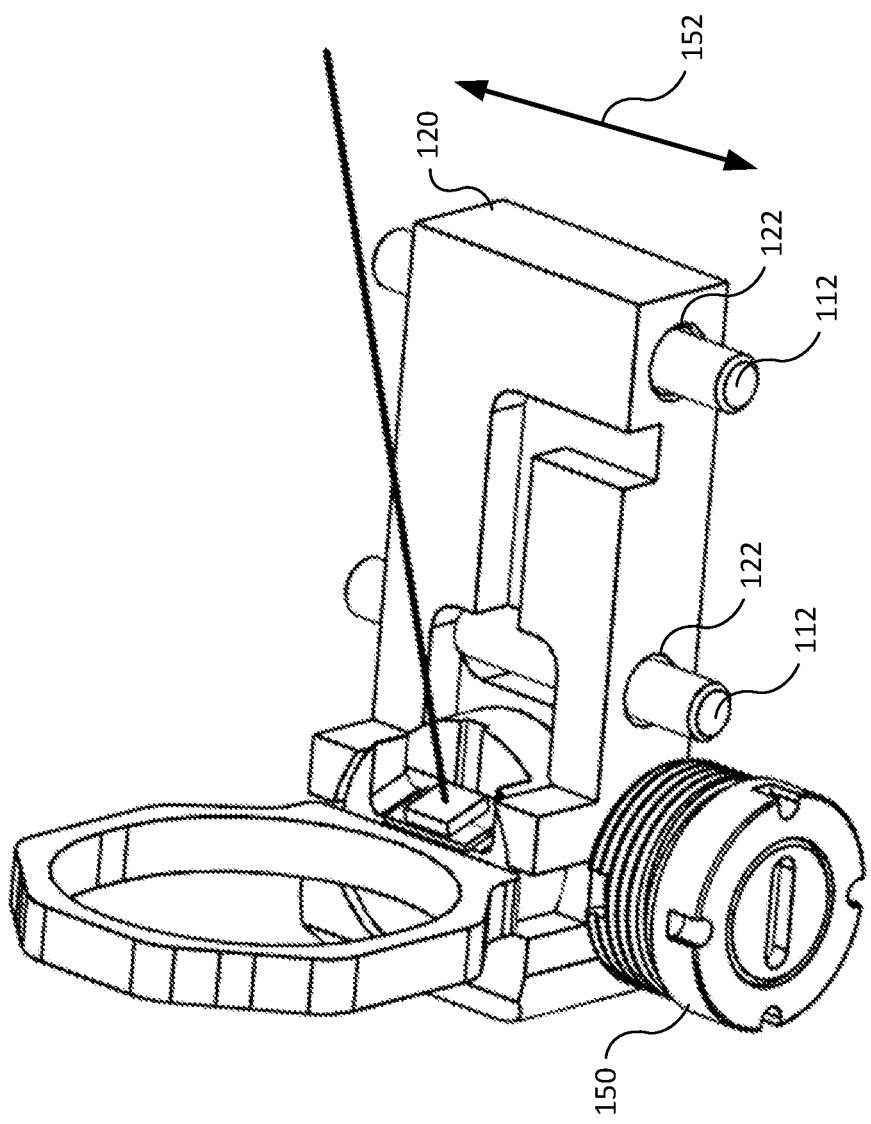
FIG. 2 is a perspective view of a carrier plate that is adjustable within the target sight of FIG. 1, according to embodiments.

FIG. 2 is a perspective view of the carrier plate 120 that is adjustable within the target sight of FIG. 1, according to embodiments. In this embodiment, the carrier plate 120 includes two apertures 122, which run laterally through the width of the carrier plate 120. A pin or dowel 112 is inserted within each aperture 122. Although two pins 112 and two apertures 122 are illustrated, embodiments of the invention may include any number of pins and apertures. The pins 112 are secured to the base 102 (FIG. 1). This arrangement of the pins 112 and apertures 122 allows the carrier plate 120 to travel left to right, in the horizontal axis relative to the base 102 (FIG. 1), by sliding over the stationary pins 112. The distance between the apertures 122 provides stability and allows the carrier plate 120 to move laterally without binding. Although the pins 112 are illustrated as having a round cross-section, the pins may be any shape. Similarly, the apertures 122 may be any shape, so long as the apertures are large enough to accept the pins 122 therethrough. The pins 112 may be formed of any durable material, such as metal or hardened plastic. The carrier plate 120 may also be formed of a durable material, such as plastic or a composite material. In some embodiments the pins 122 may be lubricated. In other embodiments the apertures 122 may include a material that reduces sliding friction.

An adjuster, such as a horizontal adjustment screw 150 allows the user to control the horizontal adjustment of the carrier plate 120. Also, a bias spring (not illustrated), is mounted horizontally between the carrier plate 120 and the base 102 (FIG. 1). This bias spring operates in conjunction with the horizontal adjustment screw 150 to provide a secure position to the carrier plate 120 so that that the carrier plate is moved only by the adjustment screw. The bias spring pushes, or provides a bias, on the side of the carrier plate 120 opposite the horizontal adjustment screw 150, keeping the carrier plate pressed up against the screw 150. Movement direction arrows 152 in FIG. 2 illustrate the direction of motion of the carrier plate 120 over the pins 112, caused by turning the horizontal adjustment screw 150 clockwise and counterclockwise.

Figure 3:
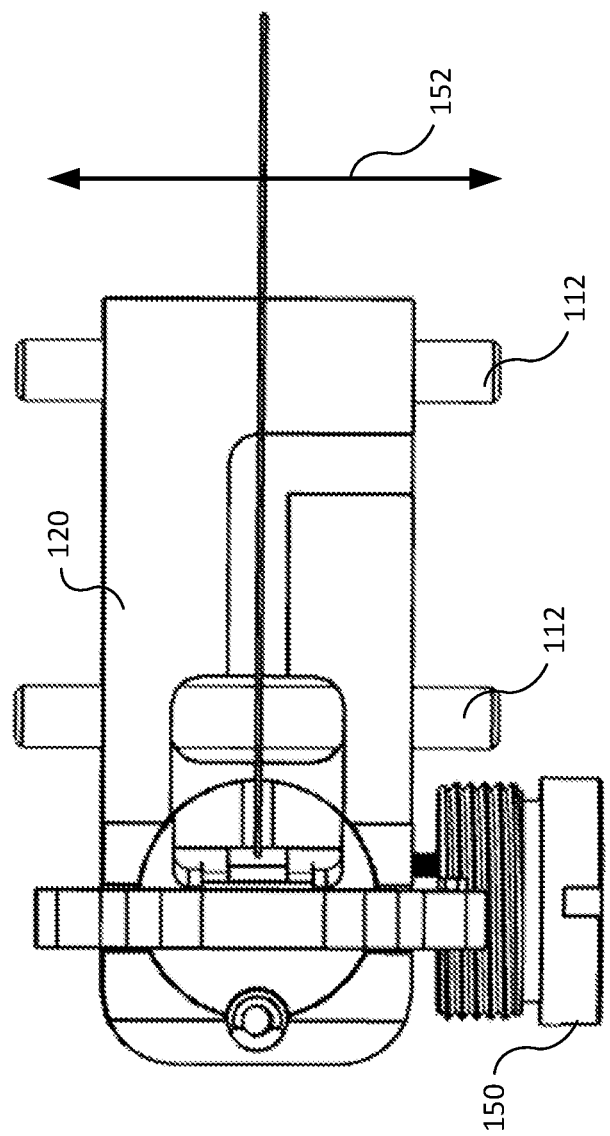
FIG. 3 is a top view of the carrier plate of FIG. 2, according to embodiments.
Figure 4:
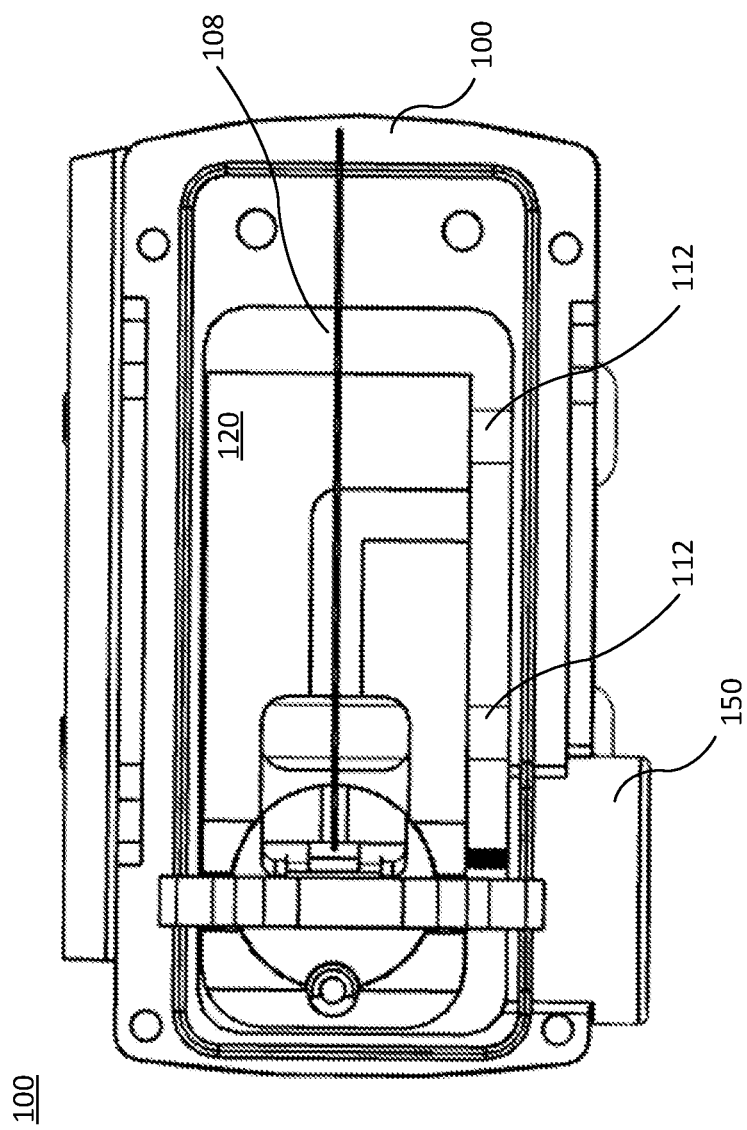
FIG. 4 is a top view of the carrier plate of FIG. 2 as well as the base of the target sight, according to embodiments.

FIG. 3 is a top view of the carrier plate 120 of FIG. 2, illustrating the direction of motion of the carrier plate 120 caused by the horizontal adjustment screw 150 as discussed. FIG. 4 illustrates the carrier plate 120 mounted within the pocket 108 of the base 102 of the target sight 100.

Figure 5:
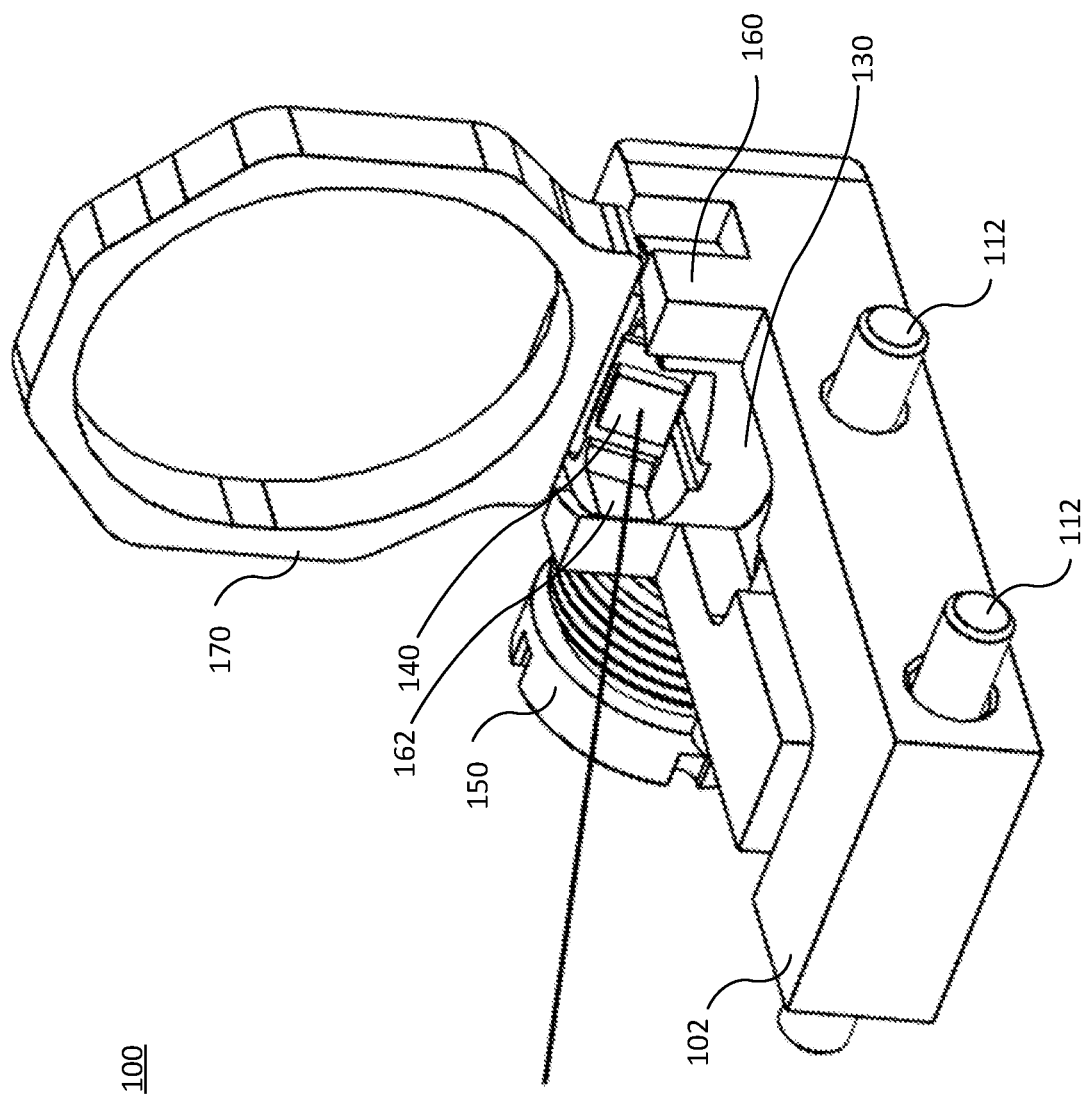
FIG. 5 is another perspective view of the carrier plate of FIG. 2, illustrating a vertically adjustable carrier mount, according to embodiments.

FIG. 5 is another perspective view of the carrier plate of FIG. 2, according to embodiments. As described above, the carrier mount 130 is coupled to and carries the illumination device 140. The vertical position of the carrier mount 130 is adjustable, discussed in further detail below, which provides the user an ability to adjust the vertical position of the illumination device 140 within the sight 100.

As illustrated in FIG. 5, the carrier mount 130 is generally cylindrical and sits in a void 162 of the carrier plate 120, which is sized and shaped to accept the carrier mount. The carrier mount 130 slides vertically within the void 162, similar to how a piston travels. In general, a vertical adjuster (not illustrated in FIG. 5) located above a vertical actuator 170 exerts downward pressure on the vertical actuator 170, which, in turn, presses downward on the carrier mount 130. In embodiments, the vertical adjustment may be an adjustment screw. The carrier mount 130 is held in balance by a spring (illustrated in FIG. 6) that is on the opposite side of the carrier mount from the vertical actuator 170. In embodiments of the disclosure, the vertical actuator 170 is ring-shaped, which allows the user to see through an optic of the sight 100.

Figure 6B:
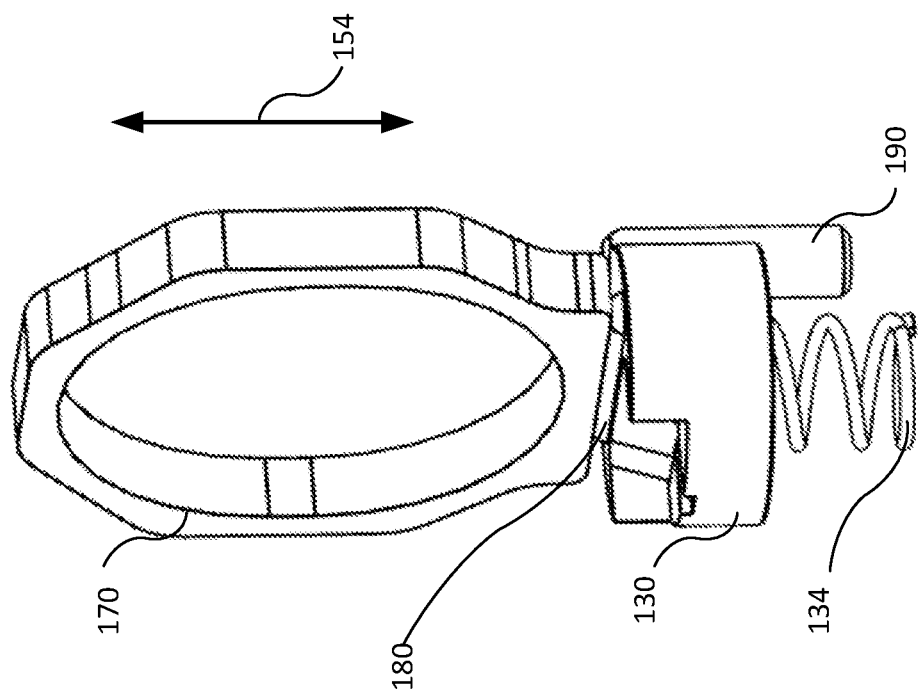
FIG. 6B is a perspective view of the carrier mount of FIG. 5, and associated components, according to embodiments.
Figure 6A:
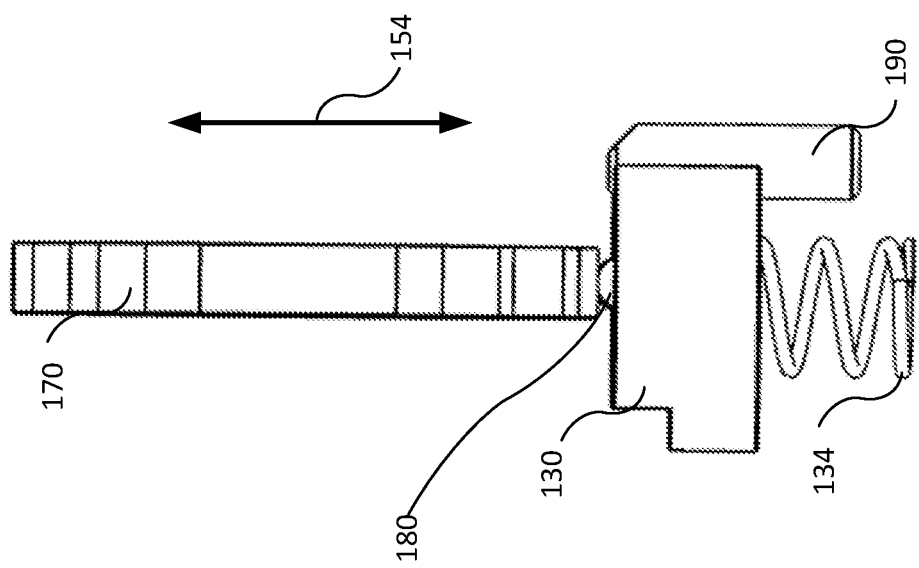
FIG. 6A is a side view of the carrier mount of FIG. 5, and associated components, according to embodiments.

FIGS. 6A and 6B are side and perspective views, respectively, of components associated with the carrier mount 130. In these figures, a spring 134 is illustrated, the function of which, as described above, is to engage the carrier mount 130 from the bottom surface of the mount. Then, the vertical adjustment (not illustrated) pushes down on the vertical actuator 170, which compresses the spring 134, and allows the user to adjust the vertical position of the carrier mount 130 downward relative to the carrier plate 120 (FIG. 5). The carrier mount 130 is raised by releasing the vertical adjustment, such as an adjustment screw, which causes the spring 134 to exert its spring force to move the carrier mount upward. Thus, the user can adjust the carrier mount 130 in the vertical direction, as illustrated by movement direction arrows 154.

Figure 7:
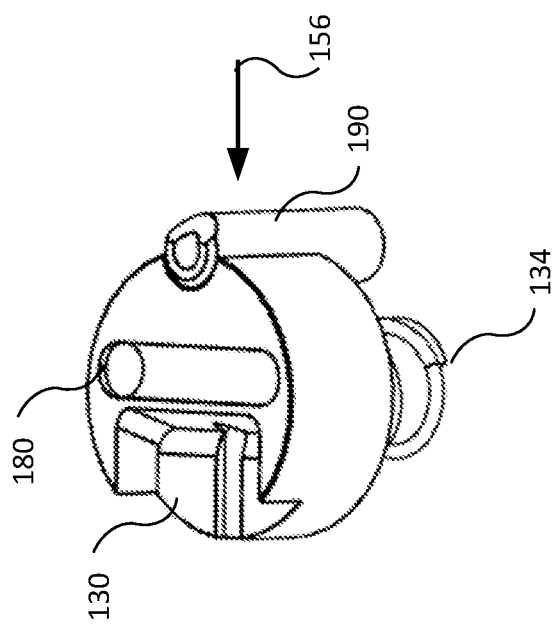
FIG. 7 is another perspective view of the carrier mount of FIG. 5, and associated components, according to embodiments.

As illustrated in FIG. 7, embodiments of the carrier mount 130 may include a slide bearing 190. The slide bearing 190 may be formed of a soft material having low friction, such as PTFE (Polytetrafluoroethylene), and allows the carrier mount 130 to easily slide within the void 162 (illustrated in FIG. 5) of the carrier plate 120. As illustrated in FIG. 7, the slide bearing 190 may be hollow and structured to provide a forward bias, in the biasing direction 156 as illustrated, to retain and stabilize the carrier mount 130 within the void 162 and allow it to smoothly travel in the vertical direction.

Referring back to FIGS. 6A and 6B, another slide bearing 180 allows a bottom surface of the vertical actuator 170 to slide across the carrier mount 130 as the carrier plate 120 is adjusted laterally, as described above. In other words, in this embodiment, the vertical actuator 170 does not move laterally with respect to the body of the sight 100 as the carrier plate 120 is adjusted in the horizontal direction, but rather maintains its lateral position by sliding along the slide bearing 180. This unique configuration allows the user to adjust the vertical position of the carrier mount 130 no matter what lateral position the carrier plate 120 is in.

Figure 8:
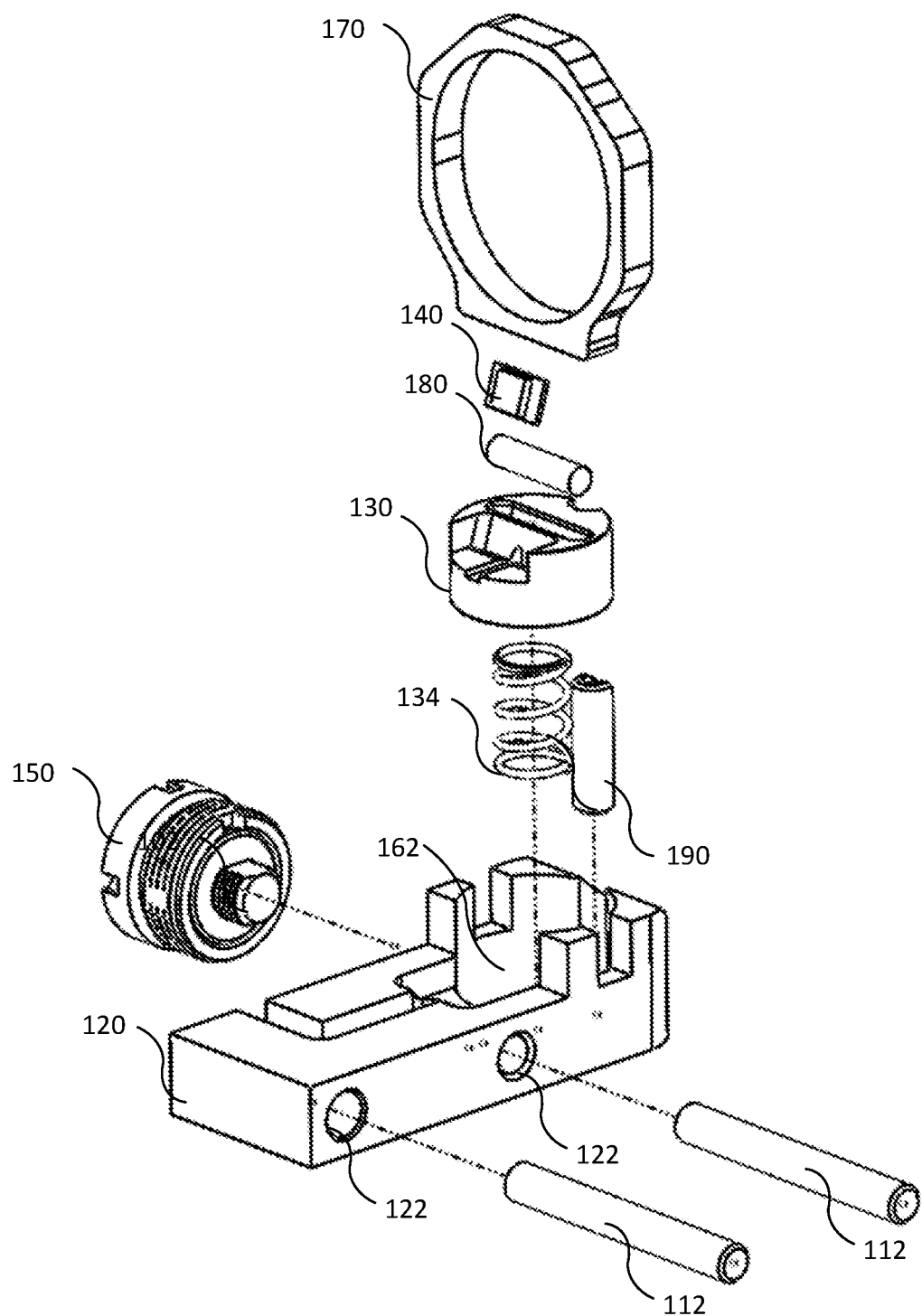
FIG. 8 is an exploded view of components of the adjustable target sight of FIG. 1 according to embodiments of the invention.

FIG. 8 is an exploded view of components of the adjustable target sight 100 of FIGS. 1-7 according to embodiments of the invention. Although a vertical adjustment mechanism is not illustrated in FIG. 8, embodiments of the invention may nonetheless include a vertical adjustment to act upon the vertical actuator 170.

Figure 9:
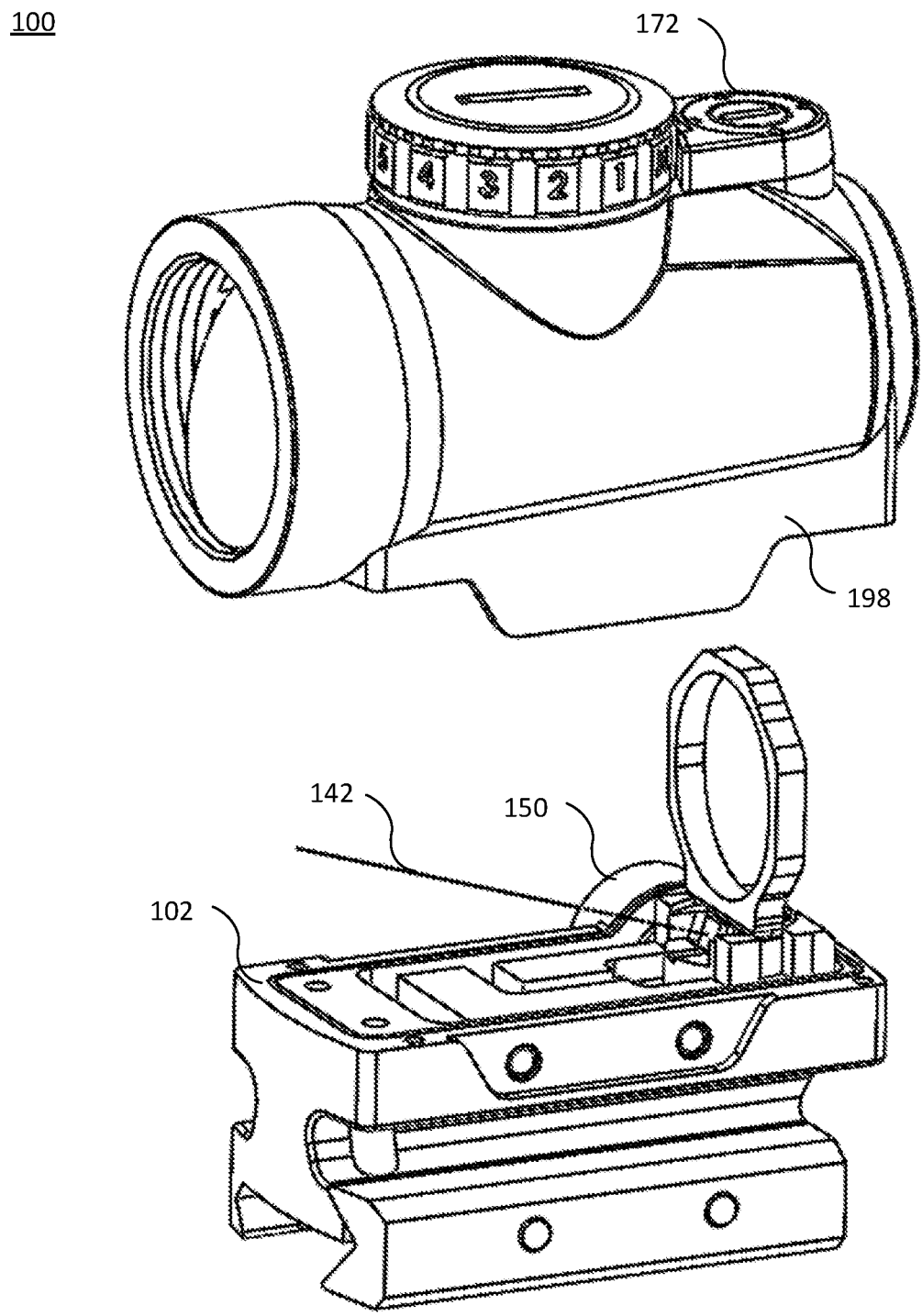
FIG. 9 is an exploded perspective view of components of an adjustable target sight according to embodiments of the invention.
Figure 21:
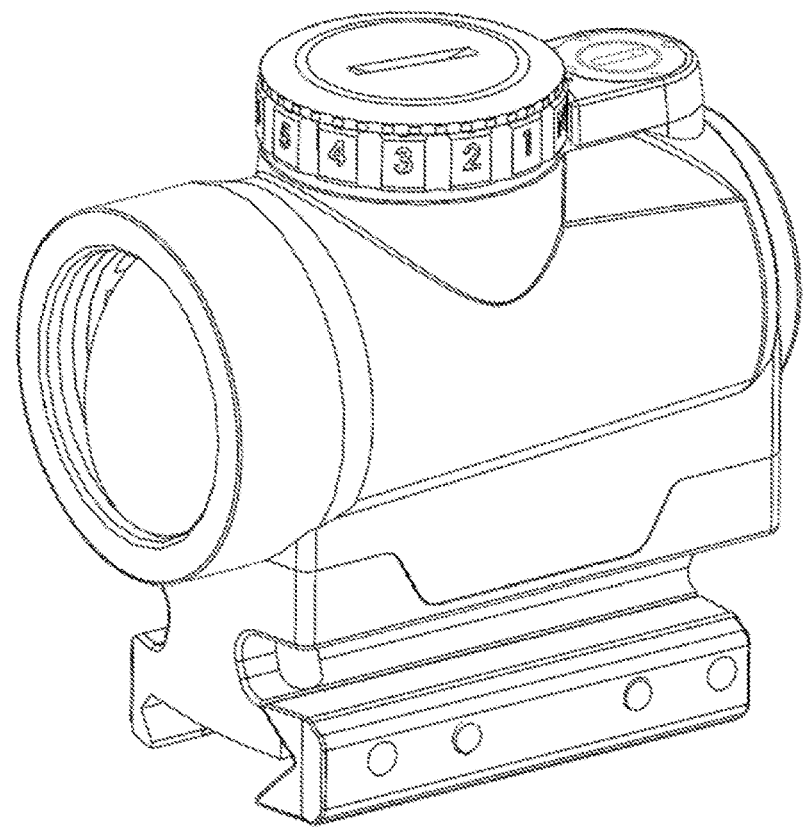
FIG. 21 is a perspective view of an assembled adjustable target sight, according to embodiments.

FIG. 9 illustrates both a base 102 and housing 198 of the target sight 100. As illustrated, a vertical adjustment screw 172 is disposed within the housing 198 and allows the user to make vertical adjustments to the beam 142 as described in relation to FIGS. 5-7 above. Also as described above, the horizontal adjustment screw 150 allows the beam 142 to be adjusted in the horizontal direction, giving the user full adjustment control of the beam both horizontally and vertically. A fully assembled view of the target sight 100 containing the elements described in FIGS. 1-9 is illustrated in FIG. 21.

Figure 10:
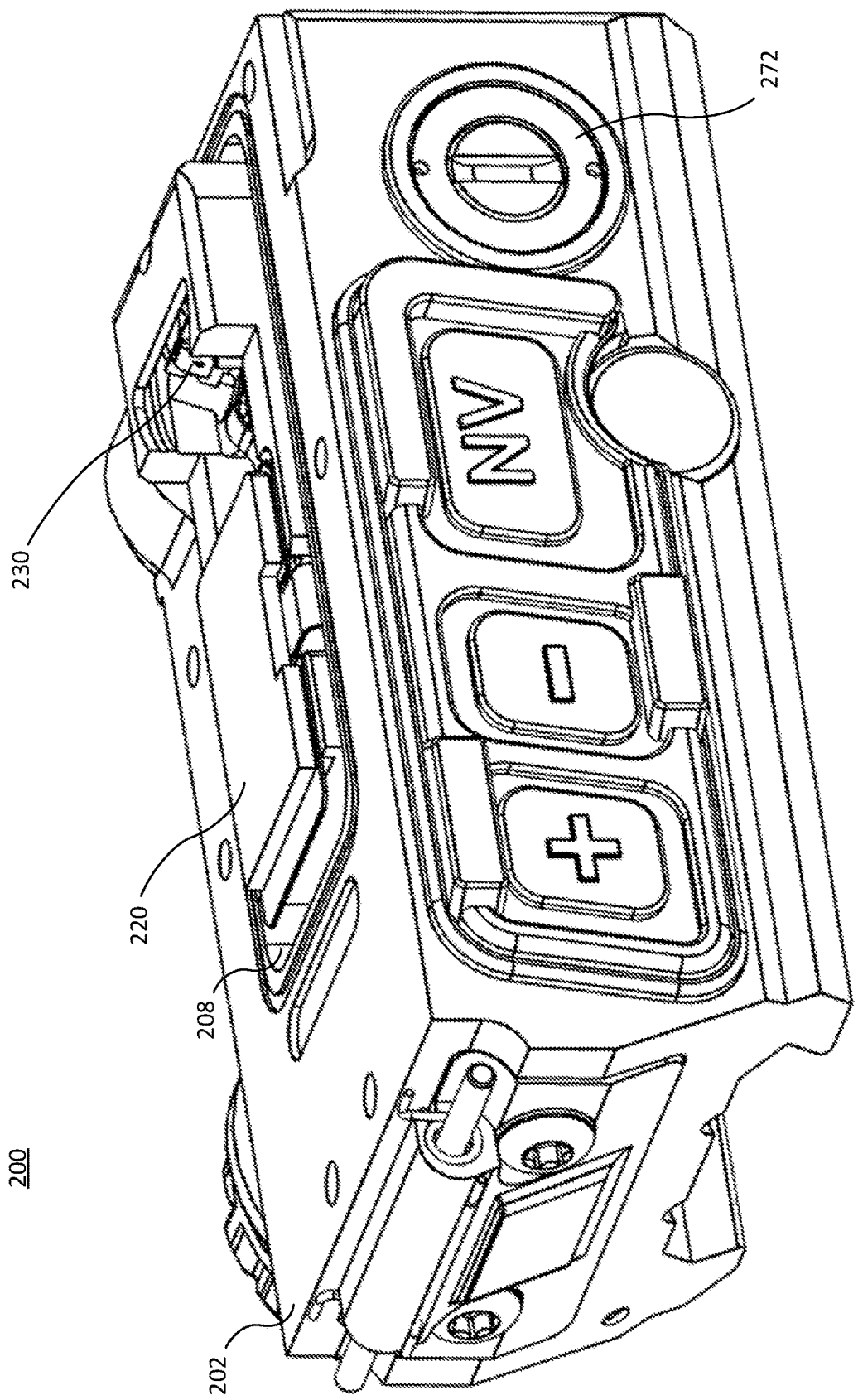
FIG. 10 is a perspective view of components of another adjustable target sight according to embodiments of the invention.

FIG. 10 is a perspective view of components of another adjustable target sight according to embodiments of the invention. The embodiment described with reference to FIGS. 10-15 is generally similar to the embodiment described with reference to FIGS. 1-9 above but differs in several ways. In general, the horizontal adjustment is the same or similar to that described above. The vertical adjustment, however, is substantially different from that discussed with reference to FIGS. 5-7, as discussed below.

As illustrated in FIG. 10, in general, a target sight 200 includes a carrier plate 220, which, in the illustrated embodiment, sits in a pocket 208 of a base 202 and adjusts laterally with respect to the base. The carrier plate 220 supports a carrier mount 230, described below and illustrated in FIG. 11. The carrier mount 230 may be the same or similar to the carrier mount 130, described above, and carries the light emitter for the sight 200. Vertical adjustment of the carrier mount 230 is made through an adjustment screw 272. Notably, as described below, the adjustment screw 272 is adjusted in a different plane than the vertical adjustment of the carrier mount 230.

Figure 11:
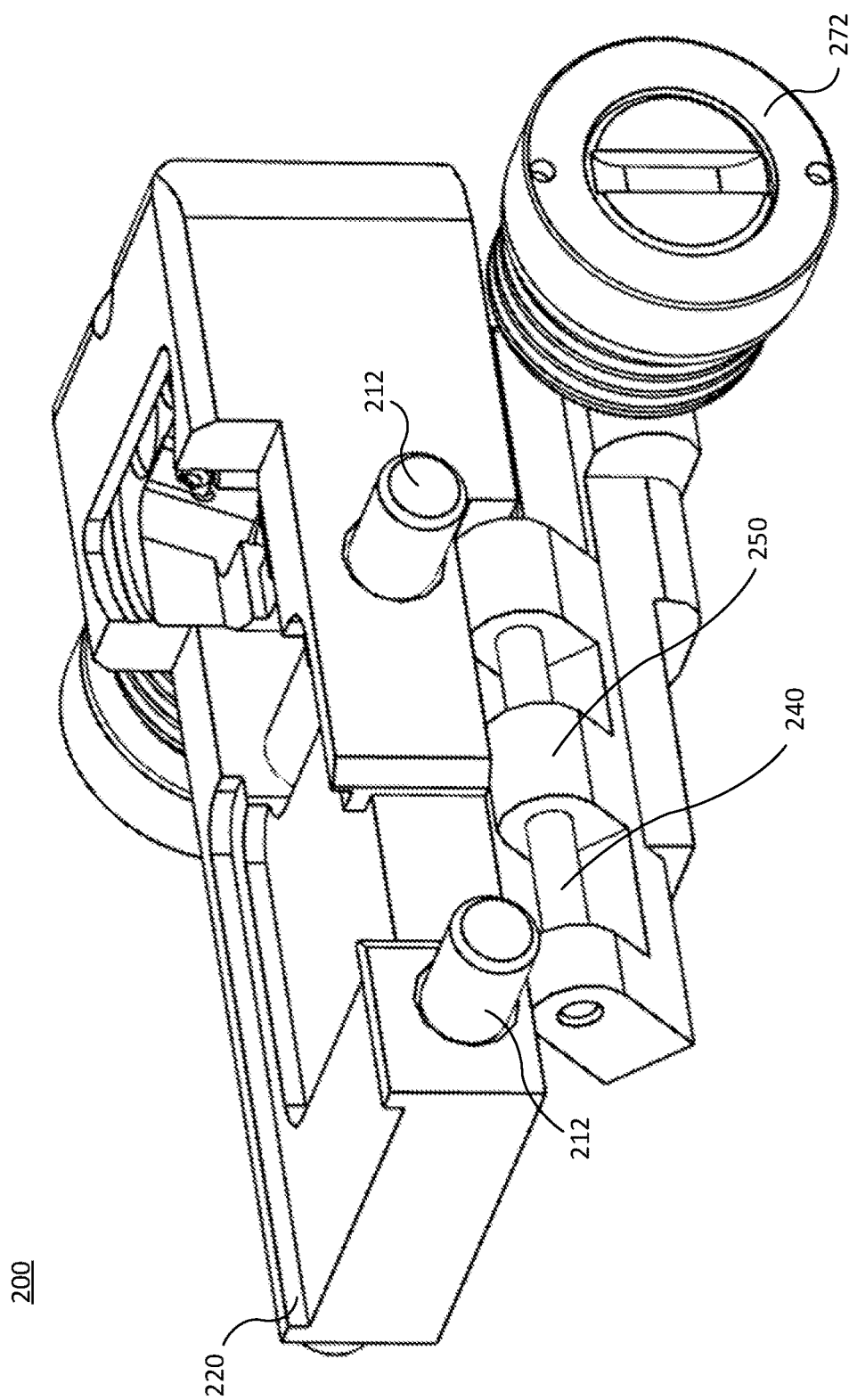
FIG. 11 is a perspective view of components of the adjustable target sight illustrated in FIG. 10, according to embodiments.

FIG. 11 is a perspective view of components of the target sight 200 according to embodiments. Elements that are the same or similar to the first embodiment described above operate in the same or similar manner, and will not be again described in detail, for brevity. Similar to above, pins 212 are inserted through apertures of the carrier plate 220 and provide a sliding guide for the carrier plate 220. Vertical adjustment of the carrier mount 230 (not illustrated in FIG. 11) is made through the vertical adjustment screw 272, which controls the action of a camming structure 250, which rotates about a hinge 240.

Figure 12:
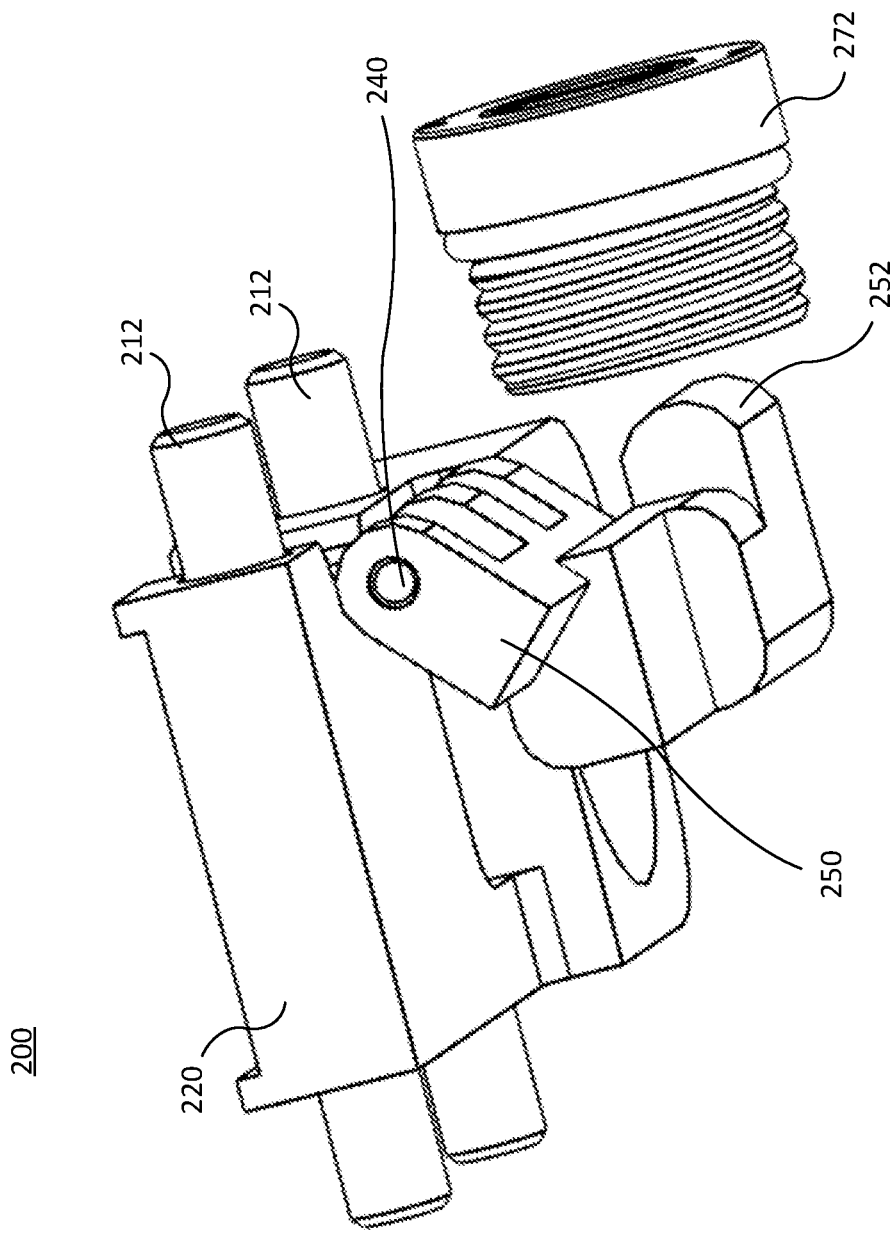
FIG. 12 is another perspective view of the components of FIG. 11, illustrating detail of a camming mechanism, according to embodiments.
Figure 13:
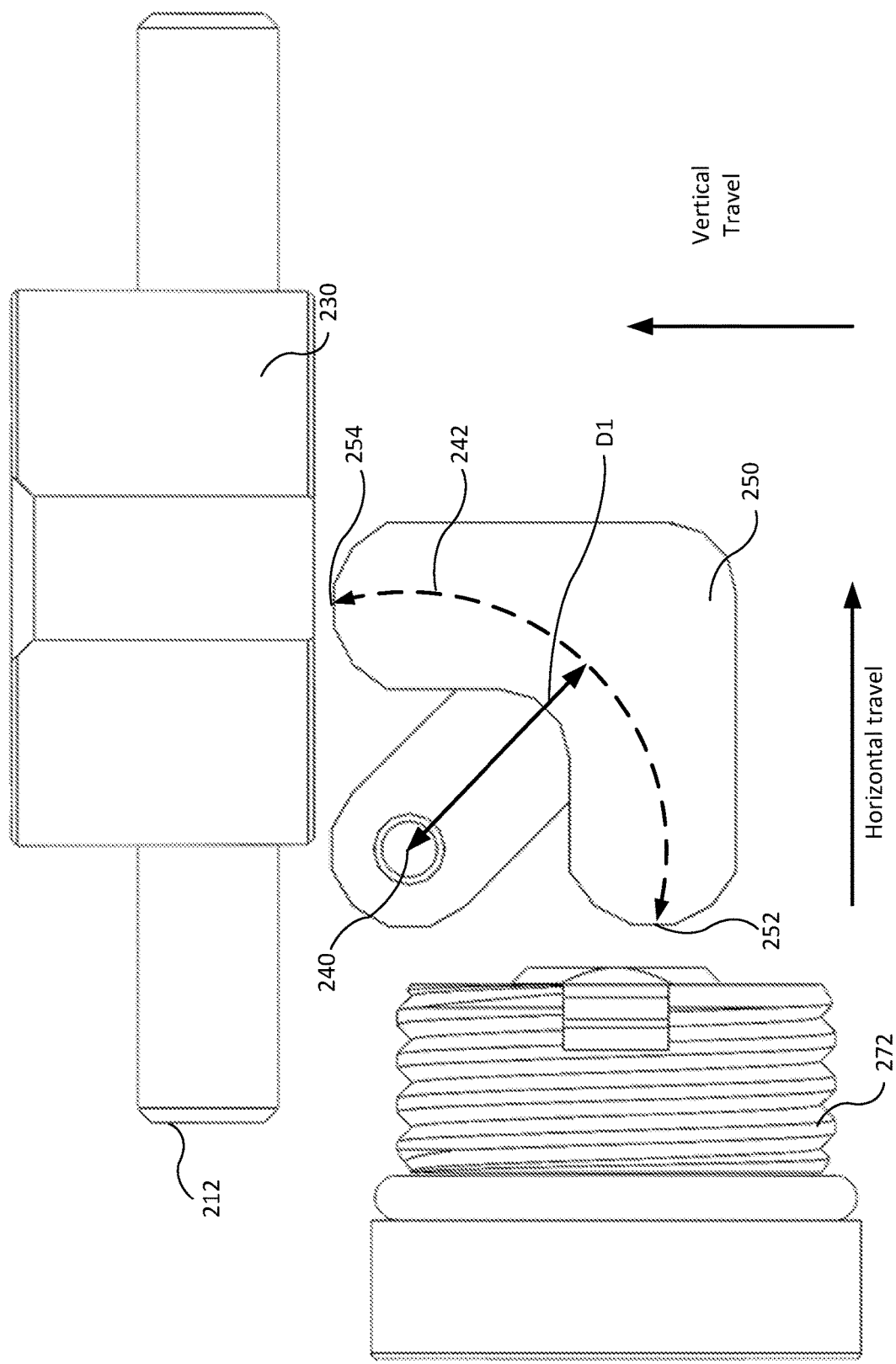
FIG. 13 is an exploded view of the components of FIG. 11, according to embodiments.
Figure 14:
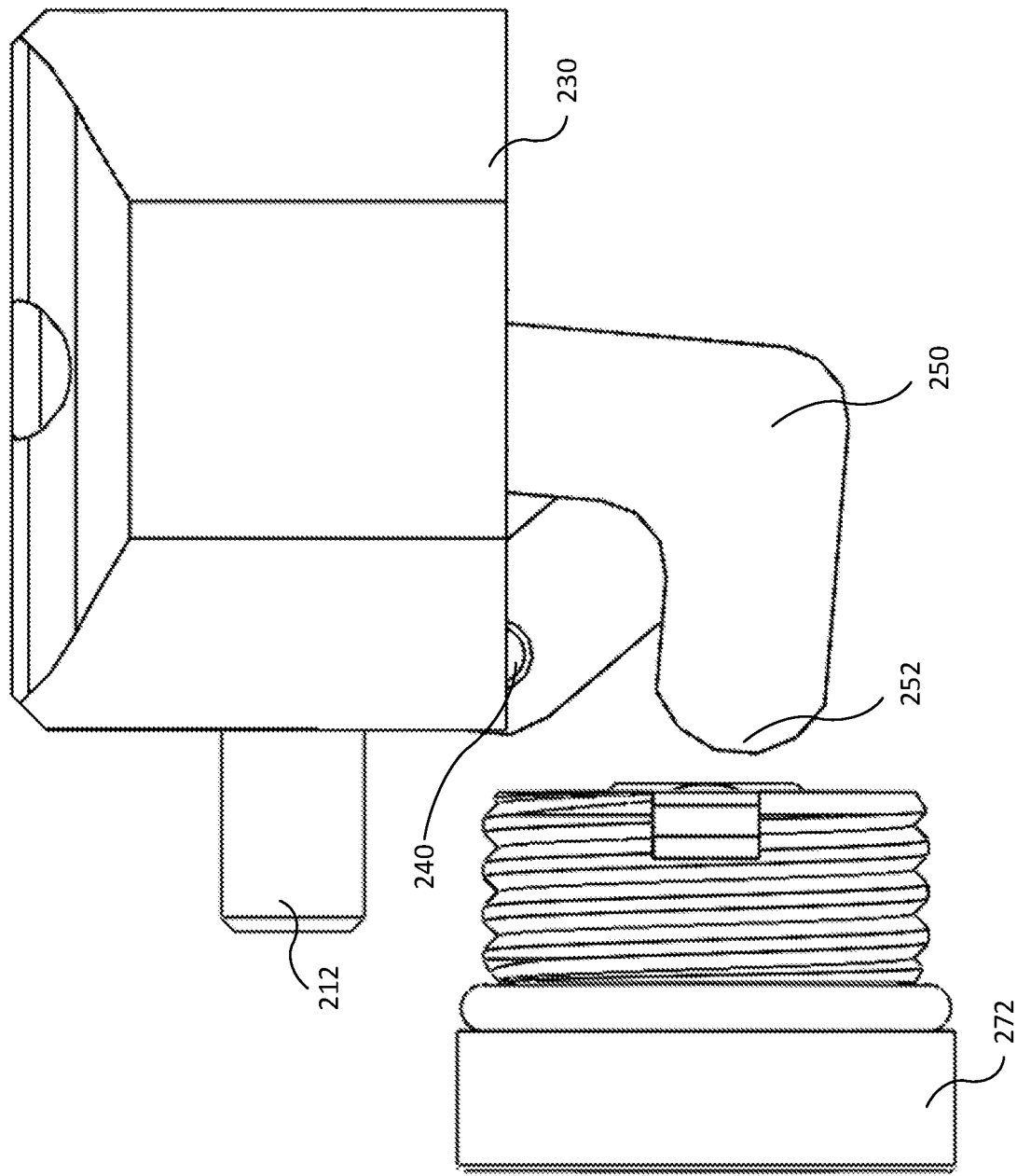
FIG. 14 is an end view of components of the adjustable target sight of FIG. 10 according to embodiments.

FIGS. 12-14 illustrate views of the carrier plate 220 and the camming structure 250. With reference to FIGS. 12-14, in operation, as described below, adjustment of the vertical adjustment screw 272 causes it to contact a first lobe 252 of the camming structure 250. Then, further adjustment of the vertical adjustment screw 272 causes the camming structure 250 to rotate about the hinge 240. As the camming structure rotates about the hinge 240, a second lobe 254 of the camming structure 250 (illustrated in FIG. 13) applies a vertical force against the underside of the carrier mount 230, to raise the vertical position of the carrier mount 230 relative to the carrier plate 220, and, by extension, raise the emitter for the target sight 200. Springs or other biasing structures (not illustrated) are mounted to the top of the carrier mount 230 and provide a downward bias to the carrier mount. The hinge 240 mounts to mating structures (not illustrated) on the underside of the carrier plate 220 within a main body of the sight 200 and couples the camming structure 250 to the carrier plate in a rotating relationship about the hinge.

With reference to FIG. 13, in the illustrated embodiment, note that centers of the lobes 252, 254 of the camming structure 250 are equidistant (shown as distance D1) from the center of the hinge 240. This results in a 1:1 ratio of horizontal travel of the vertical adjustment screw 272 to the vertical travel of the carrier mount 230 as the camming structure 250 travels in an arc path 242 when the vertical adjustment screw 272 is turned. In other embodiments the lobes 252, 254 of the camming structure 250 may have different lengths, or sizes, which results in a different ratio of horizontal travel of the vertical adjustment screw 272 to the vertical travel of the carrier mount 230.

Figure 15:
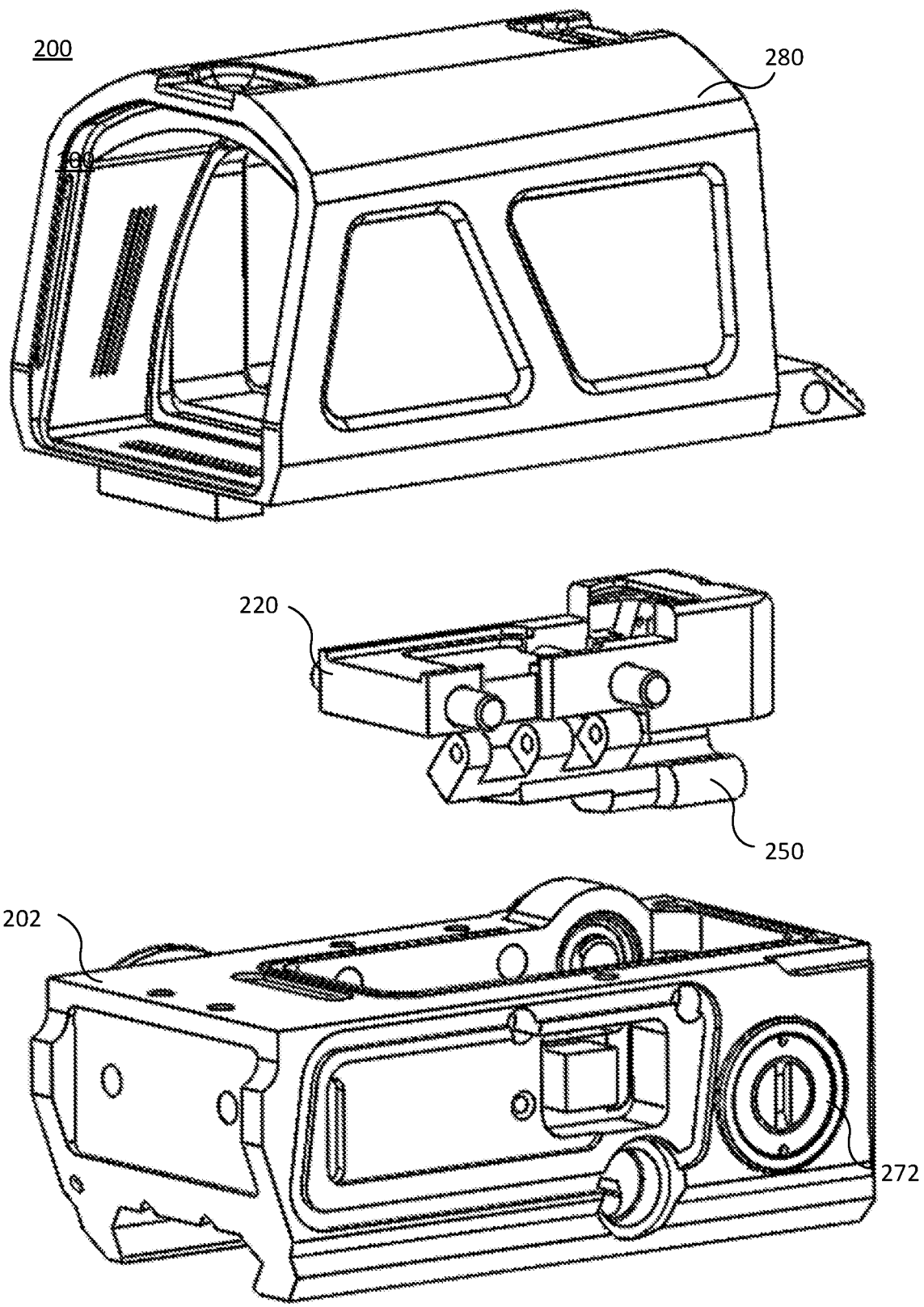
FIG. 15 is an exploded view of the adjustable target sight of FIG. 10, according to embodiments.

FIG. 15 is an exploded view of the adjustable target sight of FIG. 10, according to embodiments, which illustrates how the carrier plate 220 fits within the base 202. In addition to the components illustrated above, FIG. 15 further illustrates a cover structure 280, which is mountable to the base 202 to seal the adjustable target sight 200.

Figure 16:
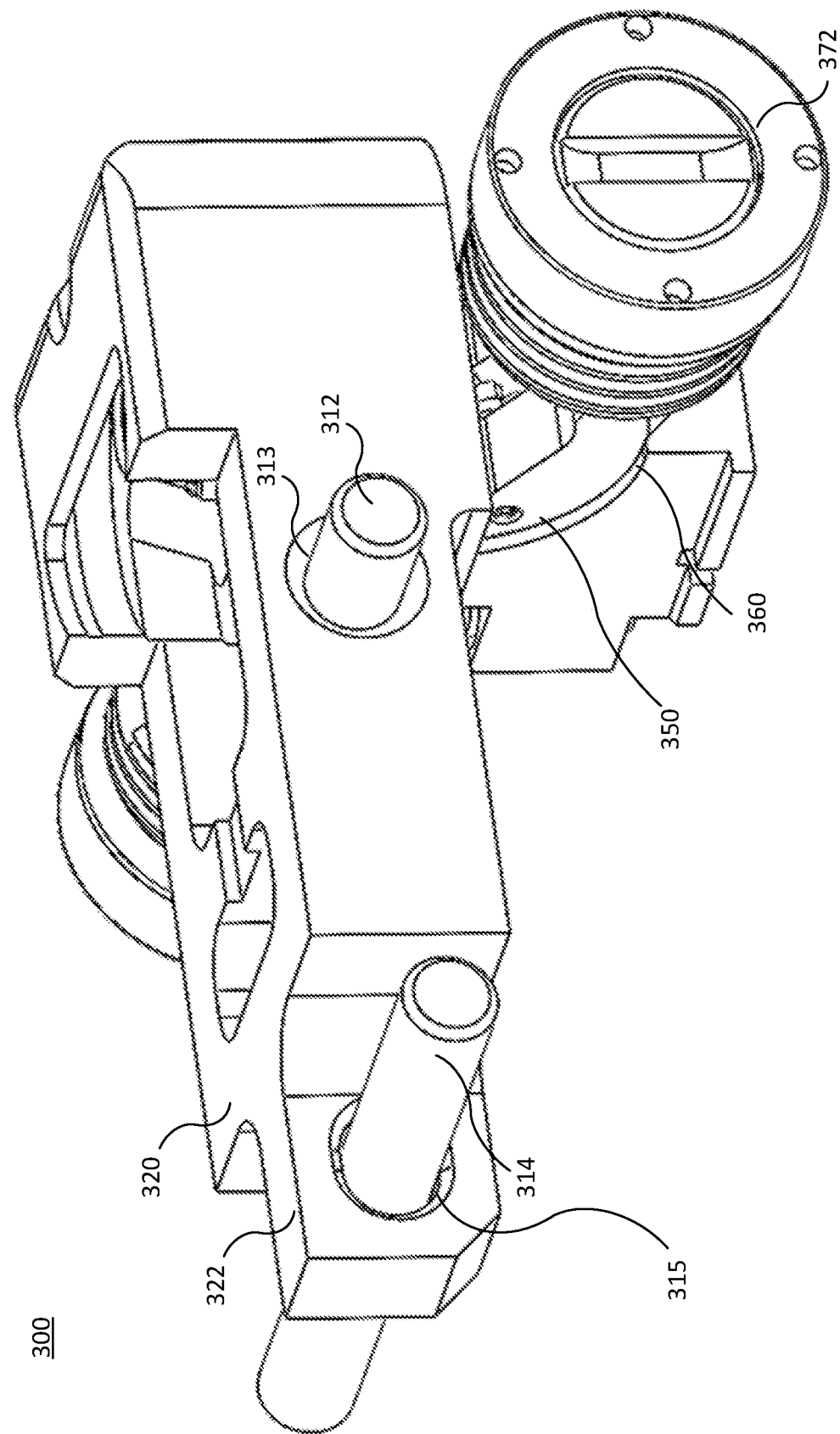
FIG. 16 is a perspective view of components of another adjustable target sight according to embodiments of the invention.
Figure 17:
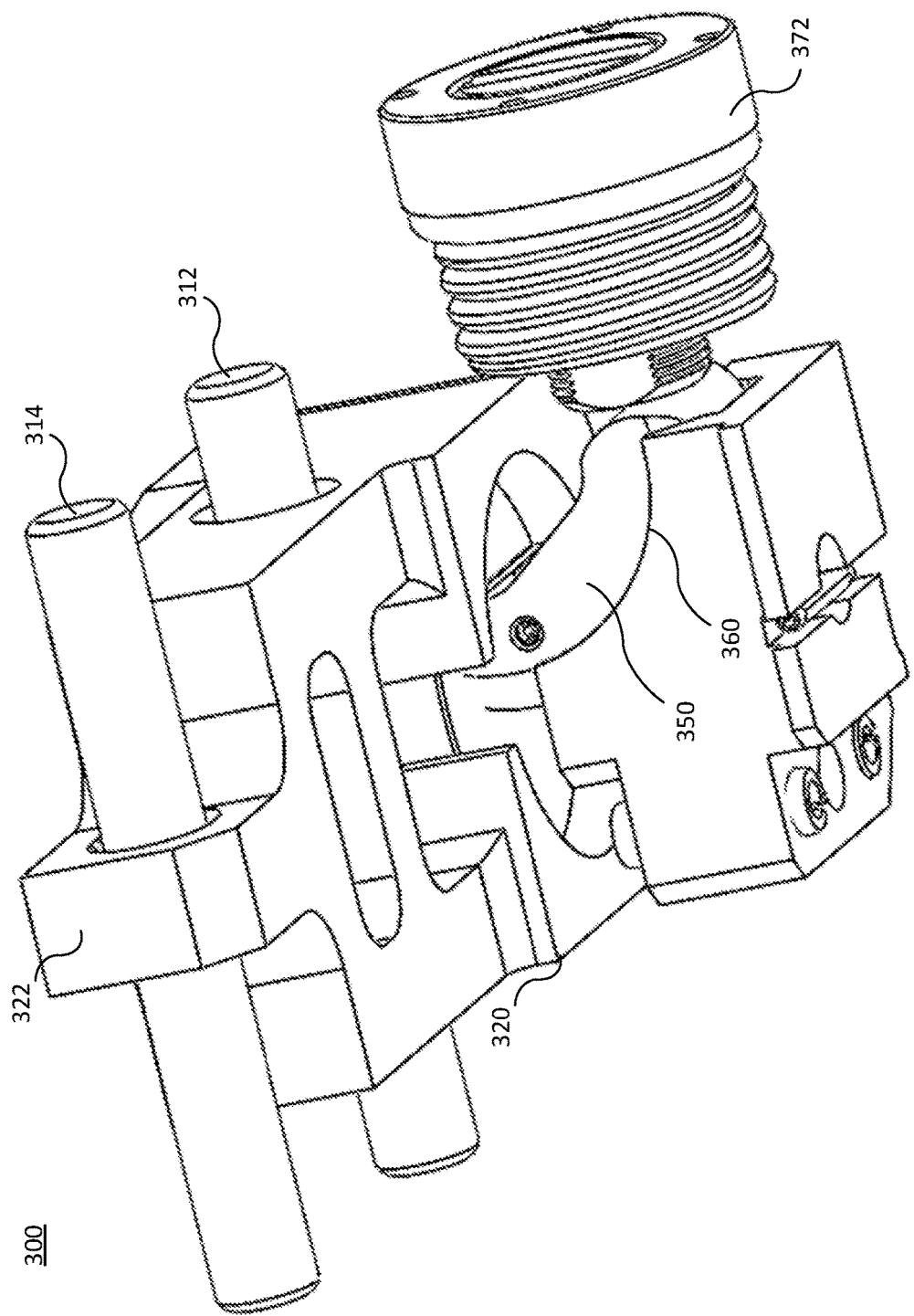
FIG. 17 is another perspective view of the components of FIG. 16, illustrating a sliding elevation adjustment mechanism, according to embodiments.

FIGS. 16-20 illustrate an additional embodiment of an adjustable target sight. With reference to FIGS. 16 and 17, in general, a target sight 300 includes a carrier plate 320, which adjusts laterally with respect to a base 302 (not illustrated in FIGS. 16 and 17). In this illustrated embodiment, horizontal adjustment is the same or similar to that of embodiments described above. Elements that are the same or similar to the embodiments described above operate in the same or similar manner, and will not be again described in detail, for brevity. Similar to above, pins re inserted through apertures of the carrier plate 320 and provide a sliding guide for the carrier plate 320. Specifically, a rear pin 312 is disposed in a rear aperture 313 of the carrier plate 320, and a front pin 314 is disposed in a front aperture 315. Differently than the carrier plates 120, 220, described above, the carrier plate 320 includes a neck portion 322, which has less material than did a front portion of the carrier plates 120, 220. Also, the front aperture 315 may have greater tolerance to its front pin 314 than the rear aperture 313 has to the rear pin 312. This combination of the carrier plate 320 including the neck portion coupled with more tolerance in the aperture 315 allows the carrier plate 320 to adjust horizontal position easier than the carrier plates 120, 220. In some embodiments, these features of the carrier plate 320 may also be formed in the carrier plates 120, 220.

Figure 18:
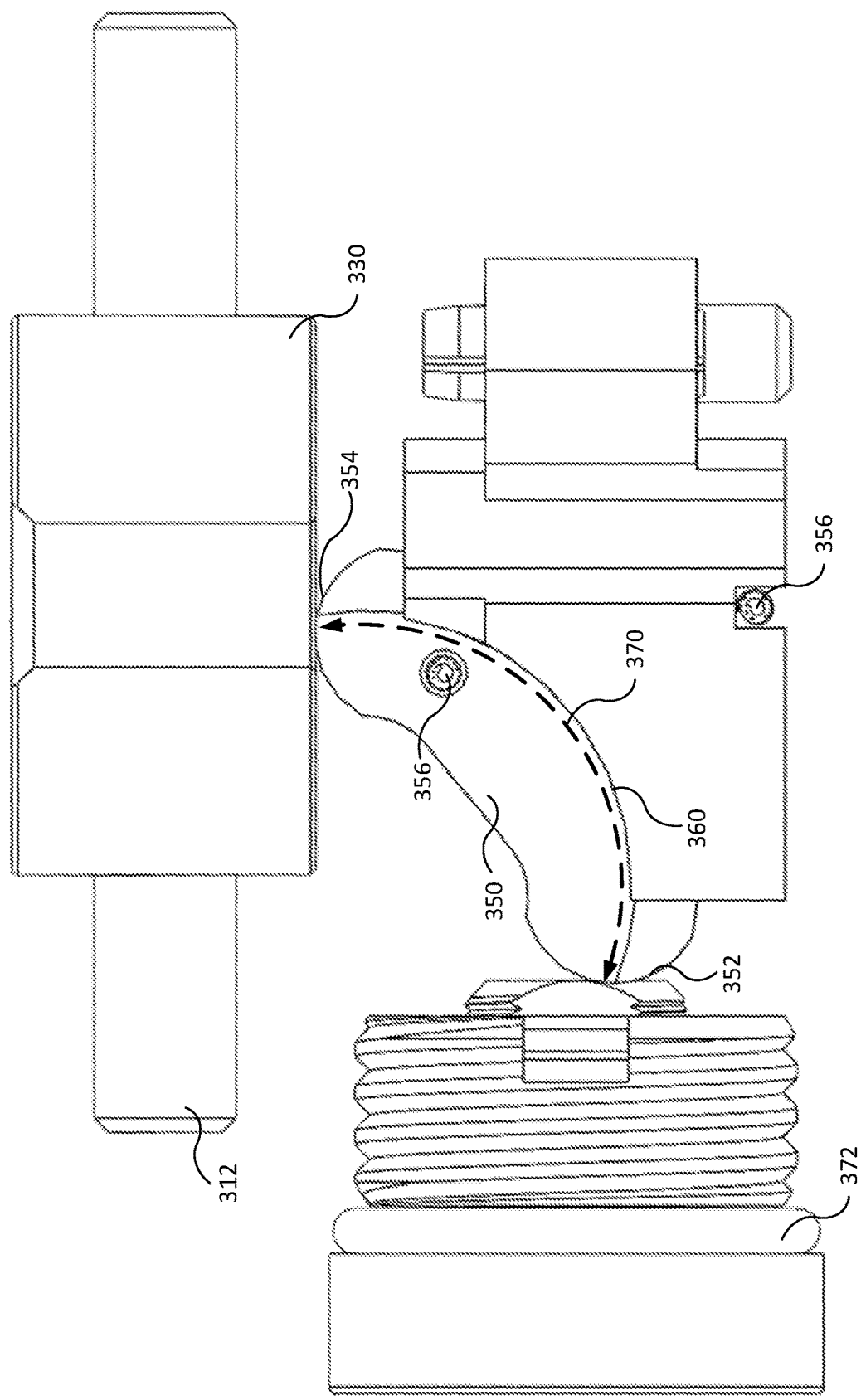
FIG. 18 is an end view of components of the adjustable target sight of FIG. 16, according to embodiments.

FIG. 18 illustrates a sliding mechanism for vertical adjustment of a carrier mount 330, which carries the light emitter for the target sight 300. In this embodiment, the sliding mechanism for vertical adjustment differs substantially from the vertical adjustment modes described with regard to other embodiments above. As illustrated in FIG. 18, vertical adjustment of the carrier mount 330 is made through a vertical adjustment screw 372, which controls the action of a slider 350. Notably, as described below, and similar to the embodiment described with regard to FIGS. 11-15, the adjustment screw 272 is adjusted in a different plane than the vertical adjustment of the carrier mount 230.

As depicted in FIG. 18, the slider 350 has a generally curved shape and sits within a curved track 360. More specifically, a surface of the slider 350 is shaped following the same curve as the curved track 360, such that the surface of the slider 350 may remain in contact with the curved track 360 as it slides. In embodiments, this surface of the slider 350, the curved track 360, and accordingly the path of the slider 350 as it travels in the curved track 360, may all be generally arc shaped, meaning their shapes may follow an arc 370 as the slider 350 translates horizontal travel of the vertical adjustment screw 372 into vertical travel of the carrier mount 330. The slider 350 also includes a first lobed edge 352 and a second lobed edge 354. The first lobed edge 352 may directly contact the vertical adjustment screw 372, and the second lobed edge 354 may directly contact a bottom surface of the carrier mount 330. The sliding mechanism of the target sight 300 may also include pins 356 for securing a spring or other biasing structure between them, described below. In operation, as the user turns the vertical adjustment screw 372, the screw pushes against the first lobed edge 352 of the slider 350. Further turning of the vertical adjustment screw 372 causes the slider 350 to slide in its curved track 360, thereby exerting vertical pressure through the second lobed edge 354 to the underside of the carrier mount 330. In response, the carrier mount 330 moves vertically and is pushed upward. And, since the carrier mount 330 is directly coupled to the light emitter of the sight 300, this vertical movement changes the PoA of the light emitter in the target sight 300.

Figure 19:
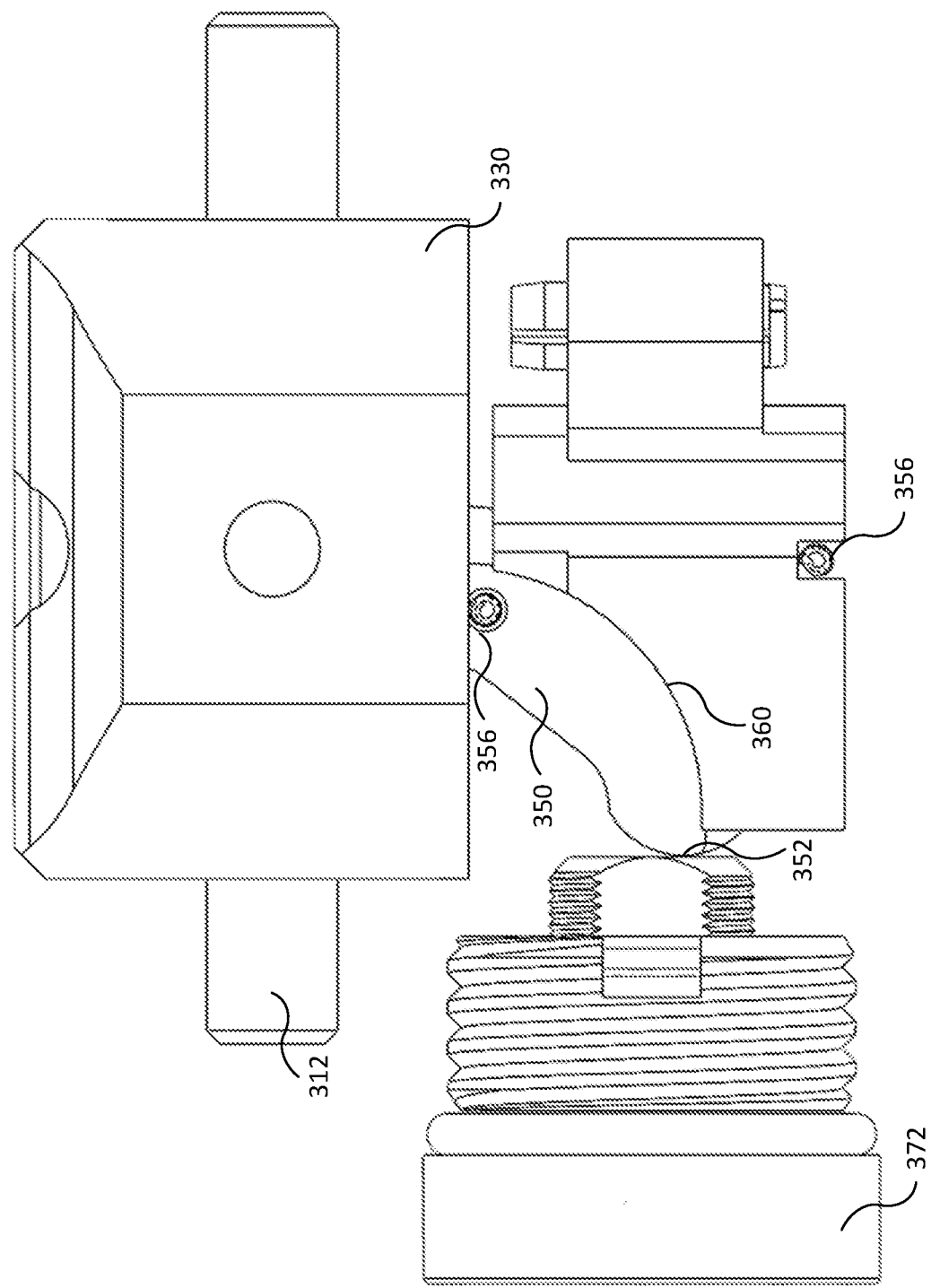
FIG. 19 is another end view of components of the adjustable target sight of FIG. 16, according to embodiments.

With reference to FIGS. 18 and 19, in operation, adjustment of the vertical adjustment screw 372 causes it to contact and press against the first lobed edge 352 of the slider 350. Then, further adjustment of the vertical adjustment screw 372 causes the slider 350 to slide in the curved track 360. As the curved slider 350 slides in the curved track 360, the second lobed edge 354 of the slider 350 applies a vertical force against the underside of the carrier mount 330 to raise its vertical position relative to the carrier plate 320. This has the effect of changing the elevation PoA as described above. The point of contact of the first lobed edge 352 may, in turn, shift along the contact surface of the vertical adjustment screw 372 as the slider 350 travels along its arc-shaped path due to the curvature of the first lobed edge 352. Similarly, the point of contact of the second lobed edge 354 may, in turn, shift along the contact surface of the carrier mount 330 as the slider 350 travels or as the carrier mount 330 itself travels via the horizontal translation described above.

A spring or other biasing structure (occluded in FIGS. 18 and 19) may join a portion of the slider 350 nearest the second lobed edge 354 and a surface under the curved track 360. Specifically, one or more pins 356, depicted in FIGS. 18 and 19, may hold each end of the spring in place near the second lobed edge 354 and under the curved track 360 as the spring extends and retracts. For example, the one or more pins 356 may be inserted through one or more loops attached to each end of the spring. Such a spring may provide a downward bias for the slider 350 and may retain the slider 350 in a position in its trace 360 such that it does not lose contact with the curved track as it travels.

In embodiments, the materials used for the slider 350 and the curved track 360 may create a low friction relationship between the components and allow for ease of travel. For example, in some embodiments, the slider 350 may be made of aluminum, and the curved track 360 may be made of brass. Other embodiments may include lubricants or other components to reduce friction between components as they move relative to one another. Nonetheless, other materials may be suitable for the desired low friction relationship, and embodiments are not limited to aluminum and brass.

Figure 20:
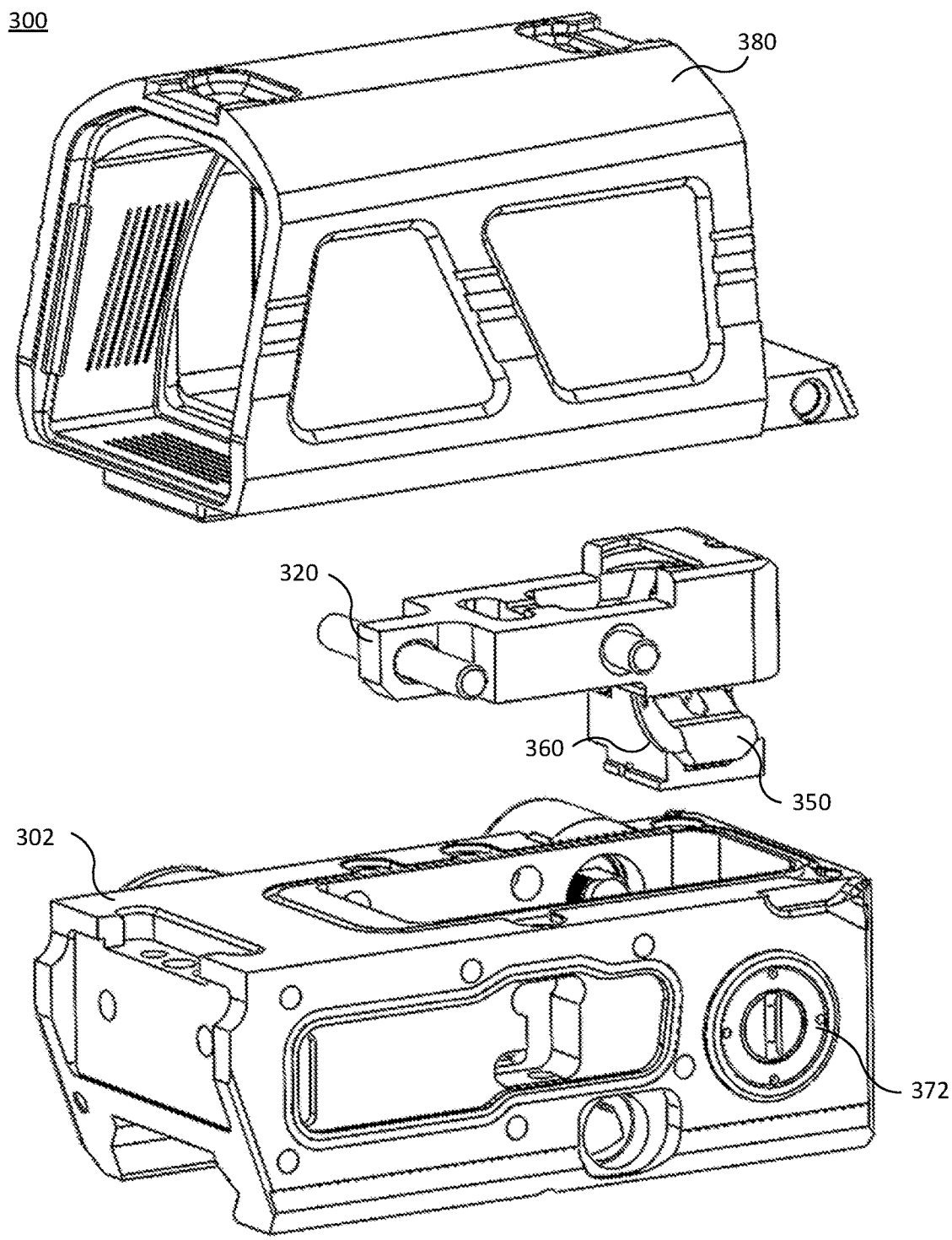
FIG. 20 is an exploded view of the adjustable target sight of FIG. 16, according to embodiments.

FIG. 20 is an exploded view of the adjustable target sight 300 as described with regard to FIGS. 16-19, according to embodiments. FIG. 20 illustrates how the carrier plate 320 fits within a base 302. In addition to the components illustrated above, FIG. 20 further illustrates a cover structure 380, which is mountable to the base 302 to seal the adjustable target sight 300.

Figure 22:
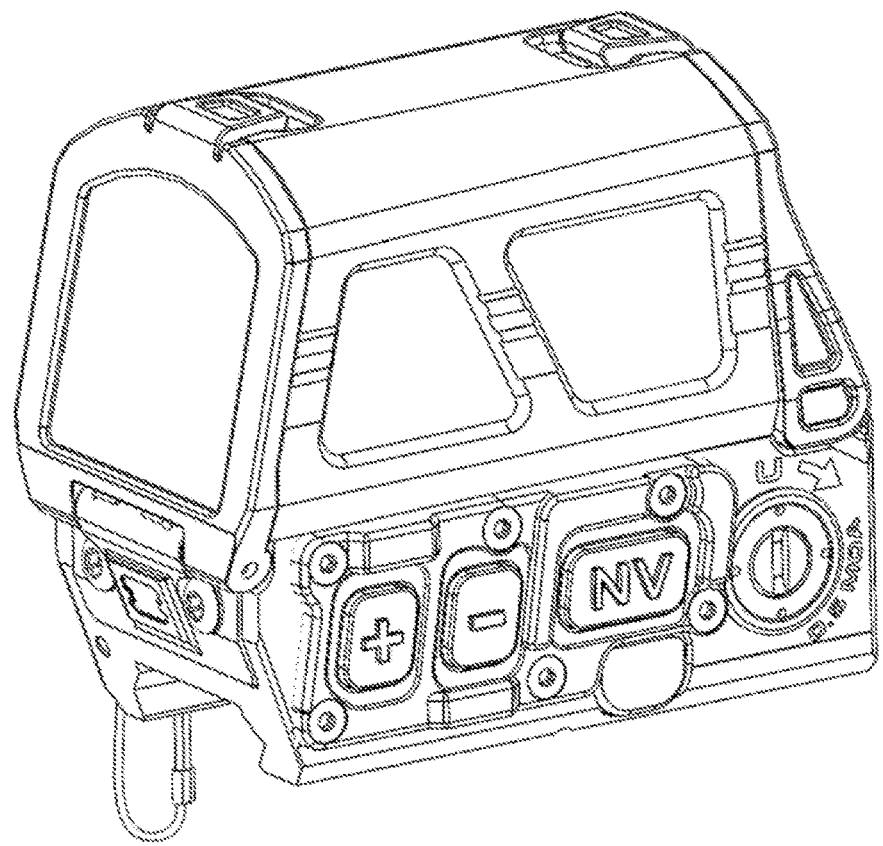
FIG. 22 is a perspective view of another assembled adjustable target sight, according to embodiments.

A fully assembled view of the target sights 200, 300 containing the elements described in FIGS. 10-20 is illustrated in FIG. 22.

The previously described versions of the disclosed subject matter have many advantages that were either described or would be apparent to a person of ordinary skill. Even so, all of these advantages or features are not required in all versions of the disclosed apparatus, systems, or methods. All features disclosed in the specification, and all the steps in any method or process disclosed, may be combined in any combination, except combinations where at least some of such features and/or steps are mutually exclusive. Each feature disclosed can be replaced by alternative features serving the same, equivalent, or similar purpose, unless expressly stated otherwise.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," "left," "upward," and "downward" are used for convenience and in reference to the views provided in figures. But the target sight and components thereof may have a number of orientations in actual use. Thus, a feature that is vertical, horizontal, to the right, or to the left in the figures may not have that same orientation or direction in actual use.

All features disclosed in the specification, including any claims, abstract, and drawings, and all the steps in any method or process disclosed, may be combined in any combination, except combinations where at least some of such features and/or steps are mutually exclusive. Each feature disclosed in the specification, including any claims, abstract, and drawings, can be replaced by alternative features serving the same, equivalent, or similar purpose, unless expressly stated otherwise.

The invention claimed is:

1. A target sight for a firearm, comprising:
   a base for securing a body of the target sight to the firearm;
   a light source coupled to a carrier mount that is disposed within a carrier plate;
   a horizontal adjustment system for the carrier plate structured to cause the carrier plate to move horizontally within the body of the target sight; and
   a vertical adjustment system for the carrier mount structured to cause the carrier mount to move vertically relative to the carrier plate, the vertical adjustment system including:
      an adjustment screw,
      a curved track, and
      a slider interfacing with the curved track and having a first edge and a second edge, the first edge structured to be acted upon by the adjustment screw and cause the slider to slide within the curved track, and the second edge structured to act upon the carrier mount and cause the carrier mount to move in a vertical direction when the slider slides within the curved track.

2. The target sight of claim 1, further comprising a retention spring structured to keep the slider engaged with the curved track.

3. The target sight of claim 1, in which a ratio of a distance the adjustment screw travels to a distance the carrier mount travels vertically is 1:1.

4. The target sight of claim 1, in which the carrier plate further includes a neck portion extending on a front portion of the carrier plate.

5. The target sight of claim 4, in which the carrier plate further comprises:
 a rear aperture;
 a front aperture disposed in the neck portion; and
 a rear pin disposed in the rear aperture and a front pin disposed in the front aperture.

6. The target sight of claim 5, in which the front aperture has a greater tolerance to the front pin than a tolerance of the rear aperture with the rear pin.

7. The target sight of claim 1, in which a surface of the slider is complementary to a surface of the curved track.

8. The target sight of claim 7, in which each of the slider and the curved track is arc shaped.

9. The target sight of claim 1, in which each of the first edge and the second edge of the slider is a lobed edge.

10. A system for adjusting a target sight for a firearm, the system comprising:
 a base mount for securing the target sight to a rail of the firearm;
 a horizontal adjustment system, including:
  a carrier plate slidably mounted to the base mount and structured to move horizontally along a width of the rail of the firearm,
  one or more apertures in the carrier plate structured to receive one or more pins of the base mount, and
  a horizontal adjustment screw structured to act on the carrier plate;
 a carrier mount coupled with the carrier plate;
 an LED secured to the carrier mount; and
 a vertical adjustment system with a vertical adjustment screw, the vertical adjustment system structured to act upon the carrier mount and cause the carrier mount to move vertically relative to the carrier plate when the vertical adjustment screw is turned, the vertical adjustment system including:
  a curved track,
  a slider interfacing with the curved track and having a first edge and a second edge, the first edge structured to be acted upon by the vertical adjustment screw and cause the slider to slide within the curved track, and the second edge structured to act upon the carrier mount and cause the carrier mount to move in a vertical direction when the slider slides within the curved track, and
  a spring coupling the slider and the curved track.

11. The system of claim 10, in which a surface of the slider is complementary to a surface of the curved track.

12. The system of claim 11, in which each of the slider and the curved track is arc shaped.

13. The system of claim 10, in which each of the first edge and the second edge of the slider is a lobed edge.

14. The system of claim 10 in which the carrier plate further includes a neck portion extending on a front portion of the carrier plate.

15. A target sight for a firearm, comprising:
 a body structured to secure the target sight to the firearm;
 a carrier mount disposed within a carrier plate;
 a horizontal adjustment system for the carrier plate structured to cause the carrier plate to move horizontally within the body of the target sight; and
 a vertical adjustment system structured to cause the carrier mount to move vertically relative to the carrier plate, the vertical adjustment system including:
  an adjustment mechanism,
  a curved track,
  a slider interfacing with the curved track and having a first edge and a second edge, the first edge structured to be acted upon by the adjustment mechanism and cause the slider to slide within the curved track, and the second edge structured to act upon the carrier mount and cause the carrier mount to move in a vertical direction when the slider slides within the curved track.

16. The target sight of claim 15, further including a light source coupled to the carrier mount.

17. The target sight of claim 15, further including a biasing structure coupled to the slider to keep the slider engaged with the curved track when the slider slides within the curved track.

18. The target sight of claim 15, in which the adjustment mechanism is an adjustment screw.

* * * * *